Figure 1:
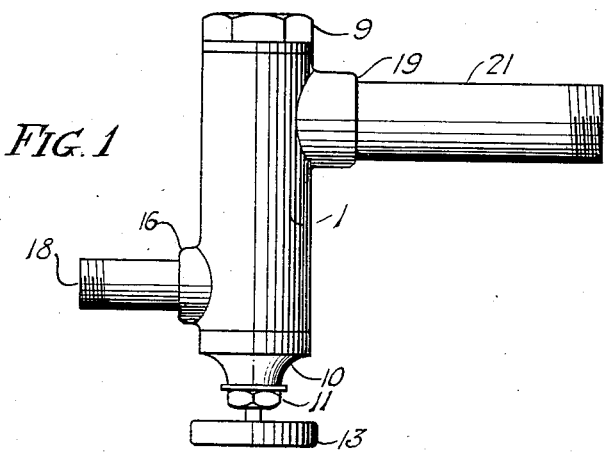

E. O. DAVIS.
VALVE.
APPLICATION FILED MAR. 30, 1911.

1,017,385.

Patented Feb. 13, 1912.

WITNESSES:

INVENTOR.
E. O. DAVIS.
BY
ATTORNEYS

UNITED STATES PATENT OFFICE.

EWING O. DAVIS, OF GREENSBORO, PENNSYLVANIA.

VALVE.

1,017,385.   Specification of Letters Patent.   Patented Feb. 13, 1912.

Application filed March 30, 1911. Serial No. 617,931.

*To all whom it may concern:*

Be it known that I, EWING O. DAVIS, a citizen of the United States of America, residing at Greensboro, in the county of Green and State of Pennsylvania, have invented certain new and useful Improvements in Valves, of which the following is a specification, reference being had therein to the accompanying drawing.

This invention relates to valves, and the primary object of my invention is to provide a valve that can be used upon a gas supply pipe to automatically close the gas supply pipe when the gas is shut off or the pressure in the gas supply drops materially.

Another object of the invention is to provide an automatic valve that is positive in its action, simple in construction and highly efficient for the purposes for which it is intended.

My invention aims to prevent the asphyxiation of persons by gas due to the supply of gas being shut off, or the pressure dropping to such an extent as to extinguish the flame, and the gas again turned on or the pressure again rising to normal unaware to the occupants of the compartment. Many accidents occur by the escape of gas into a compartment and in view of such accidents, I have devised a valve that will automatically close when the gas is shut off or the pressure materially decreased and prevent the escape of gas when the gas is again turned on or normal pressure again obtains.

With the above and other objects in view the invention resides in a novel construction, combination and arrangement of parts to be hereinafter specifically described and then claimed.

Reference will now be had to the drawing, wherein:—

Figure 2:
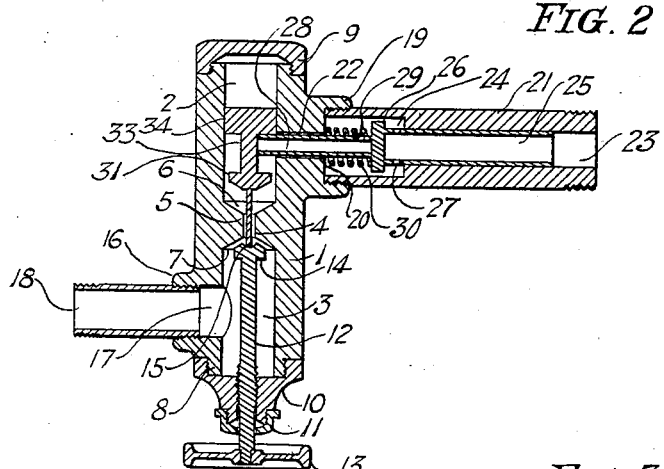
Figure 3:
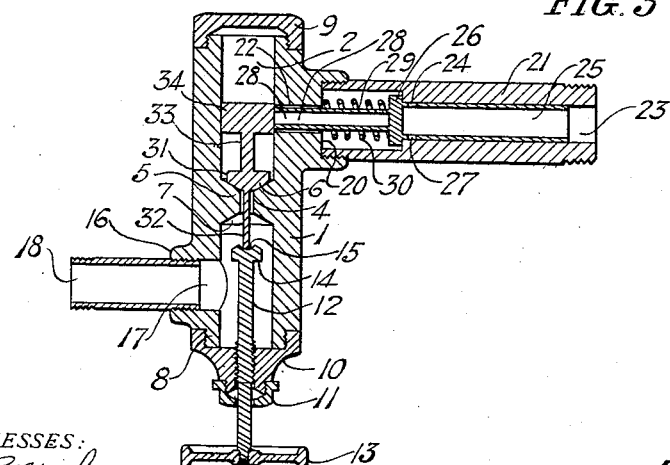

Figure 1 is a side elevation of the valve. Fig. 2 is a vertical sectional view of the valve in an open position, and Fig. 3 is a similar view of the same in a closed position.

A valve in accordance with this invention comprises a cylindrical body 1 having the upper and lower ends thereof provided with longitudinal bores or chambers 2 and 3 respectively, these bores or chambers having the inner ends thereof terminating at a horizontal partition or web 4, which has a small central opening 5 establishing communication between said bores or chambers. The top and bottom sides of the partition 4 are provided with seats 6 and 7 respectively, for a purpose that will presently appear.

The upper and lower ends of the valve body are reduced and exteriorly screw threaded, as at 8 and detachably mounted upon the upper end of the valve body is a cap 9. Detachably secured to the lower end of the valve body is a cap 10 having a stuffing box 11. Adjustably mounted in the cap 10 is a resetting rod 12 having the lower end thereof provided with a wheel or suitable handle 13 and the upper end with a head 14, said head having a small recess 15 formed therein. To adjust the resetting rod 12 it is preferable to screw thread that portion which passes through the cap 10. Near the lower end of the valve body is a boss 16 provided with an outlet opening 17 in communication with the bore 3, and screwed into the boss 16 is an outlet pipe 18. Near the upper end of the valve body on the side opposite the boss 16 is a boss 19 and this boss is provided with a socket 20 having the walls thereof screw threaded to receive the exteriorly screw threaded end of a coupling member 21. The boss 19 is provided with a small opening 22 establishing communication between the bore 2 and the socket 20. The member 21 has a longitudinal bore 23 with the inner end thereof enlarged, as at 24 and in communication with the socket 20, the opening 22 and the bore 2. Slidably mounted in the bore 23 is a tubular valve member 25 having the inner end thereof closed by a head 26 and adjacent to said head the member has diametrically opposed openings 27. The head 26 carries a tubular extension 28, having a small opening 29 adjacent to the head 26. The extension 28 extends through the opening 22 and is encircled by a coiled compression spring 30 arranged between the head 26 and the bottom of the socket 20.

Movably mounted in the bore 2 of the valve body is a shut-off valve 31 provided with a depending stem 32 which extends through the opening 5 and engages in the recessed head 14 of the resetting rod 12. The valve 31 has another stem 33 supporting a head 34 within the bore 2.

Operation: The pressure of gas entering the bore 23 of the member 21 holds the valve member 25 in an open position with the spring 30 under tension as shown in Fig. 2. The extension 28 engages under the head 34 and holds the valve 31 in an elevated position off of the seat 6, irrespective of the position of the resetting rod 12. The gas passes through the member 25, through the openings 27 into the enlarged end of the bore 23, through the opening 29 into the extension 28 and out of said extension into the bore 2. From the bore 2 the gas passes through the opening 5 into the bore 3 and into the outlet pipe 18. The stem 33 does not completely close the end of the extension 28, it being preferable to make the stem cylindrical and of a smaller size than the end of the extension 28 whereby gas can escape from said extension. The gas can also pass through the opening 22.

During the operation of the valve the resetting rod 12 is retained in a lowered position. When the supply of gas is shut off, or the pressure falls below the tension of spring 30, the latter immediately closes the valve member 25. When the extension 28 is withdrawn from beneath the head 34, the valve 31 drops and engages the seat 6, thereby closing the opening 5. The head 34 at the same time closes the opening 22, and when the gas is again turned on the valve member 25 is retained in a closed position by the end of the extension 28 engaging against head 34. The pressure of gas cannot therefore open the valve member, consequently the gas cannot escape through the valve. When it is desired to obtain gas through the valve body, the rod 12 is operated to elevate the valve 31 and immediately, upon the head 34 being raised above the opening 22, the pressure of gas against the head 26 of the member 25 shifts said member whereby the extension will engage under the head 34, and retain the valve 31 in an elevated position. It is then essential for the successful operation of the valve, that the resetting rod 12 be restored to its normal lowered position.

From the foregoing it will be observed that the valve has practically three closing points for shutting off the gas, viz; the member 25, the head 34 closing the opening 22 and the valve 31 closing the opening 5.

It is thought that the operation and utility of the valve will be apparent without further description, and while in the drawing there is illustrated a preferred embodiment of the invention, it is to be understood that the structural elements thereof are susceptible to such changes as fall within the scope of the appended claims.

What I claim is:—

1. A valve of the type described comprising a valve body having the upper and lower ends thereof provided with communicating bores, an outlet pipe carried by said body and in communication with the lowermost bore, a coupling member carried by said valve body and in communication with the uppermost bore, a valve movably mounted in the uppermost bore of said valve body and adapted to close by gravity and shut off the communication between said bores, a tubular spring pressed valve member carried in said coupling member and a valve seat for coöperating therewith, said last-named valve adapted to be placed in an open position by pressure within said coupling member, an extension carried by said last-named valve and adapted to hold the first mentioned valve in an elevated and open position when said last-named valve is in an open position, and means including a rod arranged in said valve body and adapted to restore the first mentioned valve to an open position after having been released by said extension of the last-named valve, substantially as described.

2. A valve of the type described comprising a body having communicating bores formed therein, a coupling member in communication with one of said bores, a valve movably mounted in the last-mentioned bore and adapted to shut off the communication between said bore and said coupling member and between the bores, a tubular valve member arranged in said coupling member and a valve seat for coöperating therewith, said last-named valve adapted to be maintained in an open position by pressure of gas within said coupling member, an extension carried by said last-named valve and adapted when the last-named valve is in an open position to retain the first mentioned valve in an open position, means arranged within said coupling member and adapted to close said last named valve upon decrease in the pressure of gas in said coupling member, and release the first mentioned valve to close the communication between said bores, and means carried by said valve body and adapted to restore the first mentioned valve to an open position, substantially as described.

3. In an automatically closing valve, a valve body provided with communicating chambers located respectively in the upper and lower ends of the body, said valve body having an inlet port communicating with the upper chamber and an outlet port communicating with the lower chamber, a hollow member connected to the valve body and communicating with the upper chamber through said inlet port, a slidable valve member in said hollow member and a valve seat for coöperating therewith, an extension carried by said valve member and projecting through the inlet port into the upper chamber of the valve body, a valve in said upper chamber of the valve body having a stem on its lower end projecting into the lower chamber of the valve body and having a head on its upper end underneath which head the extension of the slidable valve member is received to hold said valve open when said extension is projected into the upper chamber, a spring acting on the slidable valve member to close the latter when pressure of gas in the hollow member falls below the tension of said spring whereby the valve in the upper chamber is permitted to drop by gravity to closed position and the head of said valve closes the inlet port of the valve body, and means carried by the valve body for engagement with the stem of said valve for restoring the latter to open position.

4. In an automatically closing valve, a valve body having an upper and a lower chamber communicating one with the other, said valve body having an inlet port communicating with the upper chamber and an outlet port communicating with the lower chamber, a valve mounted in the upper chamber and adapted when the valve is closed to shut off communication between the chambers and to also close the inlet port to the upper chamber, a hollow member carried by the valve body and communicating with the inlet port, a valve-member slidably-mounted in said hollow member, and a valve seat coöperating therewith, means carried by said slidable valve-member and projecting into the upper chamber in the valve body to engage and hold the valve in said chamber normally in an open position, and means acting to seat the valve member when the fluid pressure back of said member is reduced whereby the support for the valve in the upper chamber is removed and said valve permitted to drop into position to close communication between the chambers and between the upper chamber and the inlet port.

5. In an automatically closing valve, a valve body having an upper and a lower chamber normally in communication one with the other, said valve body having an inlet port communicating with the upper chamber and an outlet port communicating with the lower chamber, a valve in the upper chamber adapted when the valve is closed to shut off communication between the chambers and also to close the inlet port to the upper chamber, a hollow member connected to the valve body and communicating with the inlet port, a slidable valve-member in said hollow member, means carried by said valve member extending through the inlet port into the upper chamber and constituting a support for normally holding the valve in said chamber in an open position, and a spring in the hollow member acting when fluid pressure in said member is reduced to close the valve-member and also withdraw the support for the valve to permit the latter to move to closed position.

6. In an automatically closing valve, a valve body having an upper and a lower chamber normally in communication one with the other, said valve body having an inlet port communicating with the upper chamber and an outlet port communicating with the lower chamber, a valve in the upper chamber adapted when the valve is closed to shut off communication between the chambers and also to close the inlet port to the upper chamber, a hollow member connected to the valve body and communicating with the inlet port, a slidable valve-member in said hollow member, means carried by said valve member extending through the inlet port into the upper chamber and constituting a support for normally holding the valve in said chamber in an open position, a spring in the hollow member acting when fluid pressure in said member is reduced to close the valve-member and also withdraw the support for the valve to permit the latter to move to closed position, and means for restoring the valve to open position to reëstablish communication between the chambers and between the upper chamber and the inlet port.

In testimony whereof I affix my signature in the presence of two witnesses.

EWING O. DAVIS.

Witnesses:
  Max H. Srolovitz,
  Christina T. Hood.

---

Copies of this patent may be obtained for five cents each, by addressing the "Commissioner of Patents, Washington, D. C."